United States Patent [19]

Finkelston

[11] 4,000,782
[45] Jan. 4, 1977

[54] TIGHTENING SYSTEM WITH QUALITY CONTROL APPARATUS

[75] Inventor: Robert J. Finkelston, Hatboro, Pa.

[73] Assignee: Standard Pressed Steel Co., Jenkintown, Pa.

[22] Filed: Sept. 19, 1974

[21] Appl. No.: 507,546

[52] U.S. Cl. .................................. 173/12; 73/139
[51] Int. Cl.² ................................... B25B 23/14
[58] Field of Search ............ 73/88 F, 139; 81/52.5; 173/12, 20

[56] References Cited
UNITED STATES PATENTS

| | | | |
|---|---|---|---|
| 1,985,916 | 1/1935 | Coates et al. | 73/139 X |
| 2,596,718 | 8/1971 | Fish et al. | 73/88 F X |
| 3,368,396 | 2/1968 | VanBurkleo et al. | 73/139 |
| 3,606,664 | 9/1971 | Weiner | 73/139 X |
| 3,643,501 | 2/1972 | Pauley | 73/139 X |
| 3,693,726 | 9/1972 | Hornig et al. | 73/139 X |
| 3,710,874 | 1/1973 | Seccombe et al. | 73/139 X |
| 3,745,820 | 7/1973 | Weiner | 73/139 |
| 3,827,506 | 8/1974 | Himmelstein et al. | 173/12 |

*Primary Examiner*—Charles A. Ruehl
*Attorney, Agent, or Firm*—Andrew L. Ney; Robert P. Seitter; Aaron Nerenberg

[57] ABSTRACT

A tightening system for tightening a fastener is disclosed herein and includes a wrench for tightening the fastener, a control system for shutting off the wrench when the fastener has been tightened to a predetermined condition and a quality control system including apparatus for determining the condition of the fastener at the predetermined condition and for also checking the operation of the system during the tightening cycle. Accordingly, an easily discernible and meaningful signal can be provided indicating that the tool has functioned properly and that the joint has been tightened to the predetermined condition.

15 Claims, 3 Drawing Figures

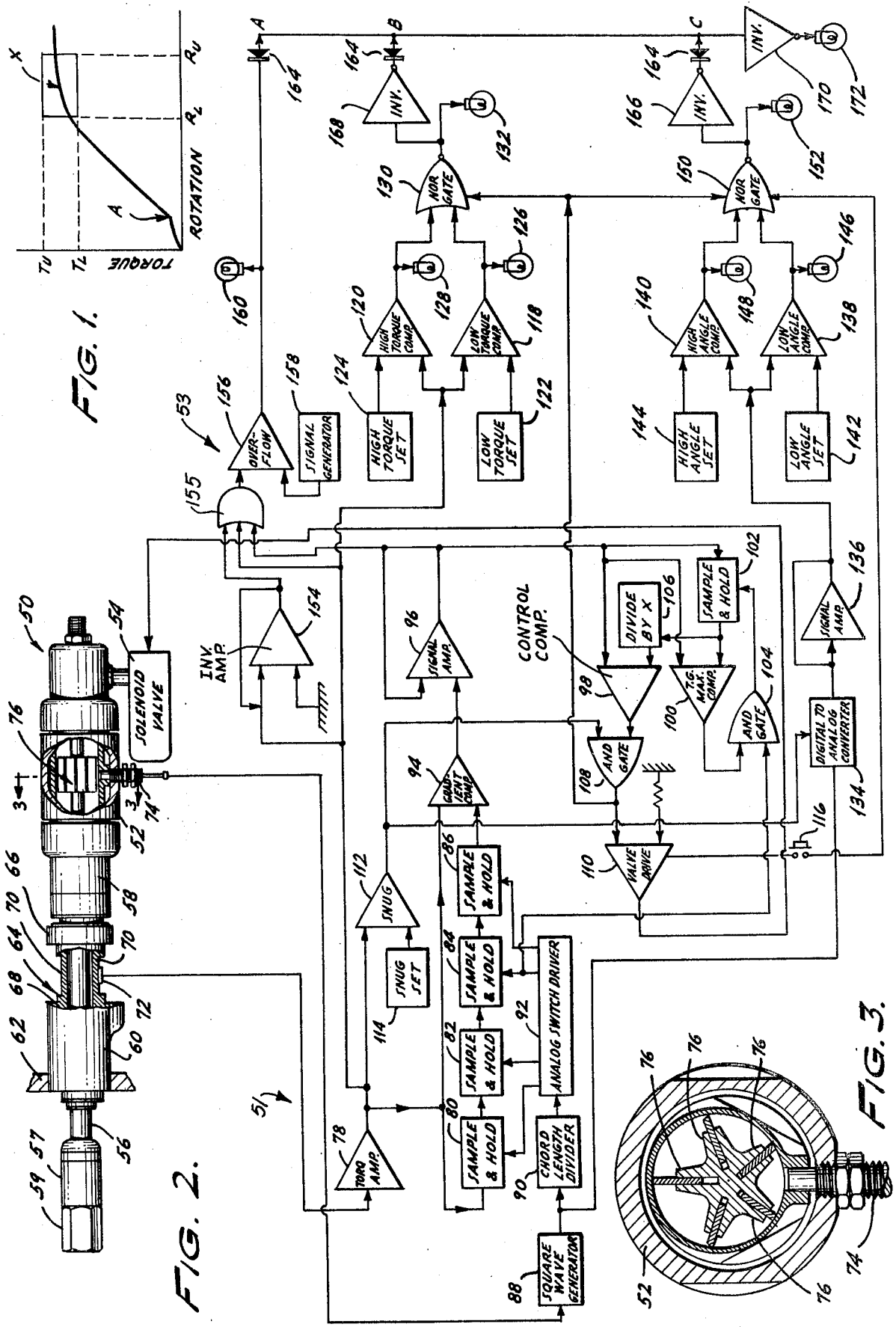

TIGHTENING SYSTEM WITH QUALITY CONTROL APPARATUS

The invention disclosed herein relates to fastener tightening systems and, more particularly, to fastener tightening systems for tightening a fastener to a predetermined condition.

With added emphasis on product reliability and safety, more emphasis has been placed on the joint assemblies within the products to improve the integrity of the assemblies and, accordingly, the reliability and safety of the products. Because it has long been known that for optimum joint integrity, the fasteners used to secure the joint assemblies should be tightened to a predetermined condition indicating that the axial design load has been induced in the fastener and is acting on the joint assembly and since it has long been recognized that conventional tightening systems such as torque controlled systems are relatively inaccurate in assembly line operations for tightening fasteners to their design loads, special emphasis has been placed on tightening systems. As a result, various sophisticated tightening systems are or will be used which control the tightening of a fastener in a joint assembly to predetermined conditions more precisely related to the design load and thus provide a relatively high degree of accuracy in the final condition of the joint.

When tightening certain joint assemblies, it has been found desirable to utilize the magnitude or other conditions of the decision making input characteristic, that is, the tightening cycle input characteristic utilized to determine that the fastener has been tightened to its predetermined condition, to provide an indication of the condition of the fastener and the joint. Such indications are used to signal assembly line operators quality control inspectors and others that the fastener and the joint have been tightened to the predetermined condition.

Certain of the sophisticated tightening systems noted above do not, however, rely solely on the magnitude or other condition of a particular tightening cycle input characteristic, but rather rely on certain relationships the utilization of which may not provide an easily discernible and meaningful indication of the condition of the fastener. Thus, time consuming tests would have to be performed to check on the condition of the fastener at the end of the tightening cycle and such testing may not be suitable for certain assembly line tightening operations.

It should also be pointed out that some of the conventional tightening systems, such as torque control systems, utilized in those certain joint assemblies noted above can provide an easily discernible indication of the condition of the fastener at the predetermined condition even though, of course, these systems do not provide a high degree of accuracy. However, if the tightening system itself has malfunctioned, an indication that the fastener has been tightened to the predetermined condition can be meaningless.

Accordingly, it is an object of this invention to provide a tightening system for tightening a fastener to a predetermined condition and which includes a quality control checking system that checks the condition of the fastener at the predetermined condition and also checks the operation of the tightening system.

It is yet another object of this invention to provide a tightening system for tightening a fastener to a predetermined condition and which includes a quality control checking system that checks the condition of the fastener at the predetermined condition and also checks the operation of the tightening system and provides an indication that both the fastener has been tightened to the predetermined condition and that the tool has functioned properly.

These and other objects of this invention are accomplished by providing a tightening system including a wrench for tightening a fastener and a control system for shutting off the wrench when the fastener has been tightened to a predetermined condition. Also included is a quality control checking system that checks the condition of the fastener at the predetermined condition and that checks the operation of the wrench and control means and determines if it is functioning properly.

More specifically, the quality control checking system includes means for determining if first and second tightening characteristics at the predetermined condition are within a range that would be expected of those characteristics at the predetermined condition and means for determining that various output signals within the system are within a predetermined range normally expected if the tool is operating in a proper manner. Depending on the results of the determinations an appropriate indicator signal can be provided.

For a better understanding of the invention, reference is made to the following description of a preferred embodiment of a tightening system in accordance with this invention taken in conjunction with the figures of the accompanying drawing in which:

FIG. 1 is a graph illustrating the relationship between two tightening characteristics utilized by the preferred embodiment of the invention disclosed herein;

FIG. 2 is a schematic illustration of a preferred embodiment of a tightening system in accordance with this invention; and, FIG. 3 is a sectional view taken along the line 3—3 of FIG. 2.

Referring now to FIG. 2 of the drawing, there is disclosed a preferred embodiment of a tightening system in accordance with this invention which includes a wrench 50 for tightening a fastener, control means generally indicated at 51 for shutting off the wrench when the fastener has been tightened to a predetermined condition and quality control checking means generally indicated at 53 providing an indication that the joint has been tightened to its predetermined condition and that the tool has not malfunctioned during the tightening cycle.

As shown in FIG. 2, wrench 50 includes an air motor 52, the operation of which is controlled by a suitable solenoid valve 54, and which drives an output shaft 56 through a speed-reducing gear box 58 so that the output shaft does not rotate at the same high speed as the motor. Output shaft 56 carries an adapter 57 for attachment with a driver bit 59 and is mounted in a suitable rotary bearing assembly 60 facilitating rotation of and taking up and bending stresses in the output shaft. Bearing assembly 60 may be mounted on a rigid frame 62, but use of the frame is not necessary for the practice of the invention. At this point it should be noted that while motor 52 has been described as an air motor, it may be of any suitable type, for example electric, hydraulic or any combination of pneumatic, electric or hydraulic. It should also be noted that the apparatus thus far described is generally conventional and need not be explained in greater detail.

Located between gear box 58 and bearing assembly 60 is transducer means in the form of a torque cell 64 which develops a signal representative of the instantaneous torque being applied to the fastener. Torque cell 64 includes a first mounting base 66 securing the cell to gear box 58 and a second mounting base 68 securing it to bearing assembly 60. Extending axially of the wrench between mounting bases 66 and 68 are a plurality of strut members 70 which are somewhat deformable, that is, are relatively rigid members capable of twisting somewhat about the axis of the wrench. When wrench 50 is operative to tighten a fastener, the reaction torque acting thereon causes strut member 70 to twist about the axis of the wrench, the amount of twist being proprotional to the reaction torque which, of course, is substantially equal to and opposite the torque being applied to the fastener. Each strut member 70 carries a strain gauge 72 which is connected in a wheatstone bridge circuit (not shown) to develop an electrical signal representative of the instantaneous torque being applied to the fastener. Instead of strain gauges, contacting of proximity displacement gauges could be used to develop the electrical signal.

Further included in the preferred embodiment of the invention is a proximity probe 74 mounted through the housing of motor 52 adjacent to and radially spaced from rotary vanes 76 in the motor, as illustrated more clearly in FIG. 3. Proximity probe 74 can be in the form of an induction coil which develops an electrical signal when metal passes through its magnetic field. Thus, as vanes 76 rotate when the fastener is being tightened, signals are provided by proximity probe 74 which represents fixed increments of rotation of the fastener. The size of the increments depend on the number of vanes 76 in motor 52 and the gear ratio of gear box 58. It should be understood of course, that proximity probe 74 could cooperate with one of the gears in gear box 58 in a similar manner.

At this point it should be noted that control system 51 is generally in accordance with the disclosure of copending application Ser. No. 507417 filed simultaneously herewith for John T. Boys for Method and Apparatus for Determining Rotational or Linear Stiffness, which application is a continuation-in-part of United States application Ser. No. 357,920 filed on May 7, 1973, now abandoned, for John T. Boys for Yield Controlled Tightening System but it should be understood that various other control systems could be utilized in accordance with this invention. The output signal from torque cell 64 representative of the instantaneous torque being applied to the fastener is fed through a torque amplifier 78 which amplifies the torque signal to a magnitude wherein it is compatible with the rest of the control system. From amplifier 78, the torque signal is fed through shift register means which, in this embodiment of the invention, comprises a series of charge coupled devices in the form of sample and hold circuits 80, 82, 84 and 86. The shift register means is clocked by signals representative of fixed angular increments of displacement of the fastener. Accordingly, signals from proximity probe 74 which are in the form of spike shaped pulses are fed through a square wave generator 88 which shapes the signals and feeds the shaped signals through a chord length divider 90 to an analog switch driver 92 which sequentially clocks the sample and hold circuits. Chord length divider 90 is a suitable divider circuit which electronically divides the pulses from square wave generator 88 by 1, 2, 4, 8, 16 or 32 so that every pulse, or every second pulse, or every fourth pulse, etc., is utilized to clock the shift register.

Analog switch driver 92, although not necessary assures that each sample and hold circuit has discharged its stored signal befoe receiving a new signal. Accordingly, analog switch driver 92 sequentially clocks the sample and hold circuits first clocking circuit 86, then circuit 84, then circuit 82, and finally circuit 80. Accordingly, sample and hold circuit 86 has discharged its stored signal prior to receiving a new signal from sample and hold circuit 84, etc. The output from sample and hold circuit 86 is representative of torque a fixed increment of rotation prior to that particular instant and is fed through a gradient register or comparator circuit 94 in the form of a differential amplifier which also receives an input signal representative of the instantaneous torque being applied to the fastener from torque amplifier 78. Comparator 94 subtracts its input signals and provides an output signal representative of the instantaneous gradient of a torque-rotation curve which could be plotted for the particular fastener being tightened. The gradient signal from comparator 94 is fed through a suitable gradient signal amplifier 96 which amplifies it to a magnitude compatible with the rest of the control system.

From gradient signal amplifier 96, the instantaneous gradient signal is fed to means for determining the maximum gradient and also to means for comparing the maximum and instantaneous gradient signals. Looking first at the means for determining the maximum gradient, there is included a maximum gradient comparator 100 receiving input signals from gradient signal amplifier 96 and from a sample and hold circuit 102 which also receives signals from gradient signal amplifier 96. As will be made clear hereinafter sample and hold circuit 102 stores a signal representative of the maximum gradient encountered up to any point in the tightening cycle prior to the instantaneous output from the gradient signal amplifier. Comparator 100 determines whether the instantaneous gradient signal from gradient signal amplifier 96 or the previously stored signal from sample and hold circuit 102 is larger. If the instantaneous gradient signal is larger, comparator 100 feeds an output signal to an AND gate 104 which also receives signals from analog switch driver 92 when the switch driver outputs a clocking signal to sample and hold circuit 84. When both signals are received by AND gate 104, it outputs an enabling signal to sample and hold circuit 102 which allows the sample and hold circuit to receive a new signal from gradient signal amplifier 96 representative of the larger gradient. If the instantaneous gradient is smaller, comparator 100 provides no output, nor does AND gate 104 so that sample and hold circuit 102 cannot accept a new gradient signal. By utilizing the clocking signal from analog switch driver 92 to sample and hold circuit 84, a time lag is provided which allows the comparison to be made before a clocking signal can be fed through AND gate 104 and before a new gradient signal can be developed.

Looking now at the means for comparing the maximum and instantaneous gradient signals, it can be seen that as the signal representative of the maximum gradient is fed from sample and hold circuit 102 to comparator 100 it is split and fed to a division circuit 106 which is operative to divide the signal by the preset relationship utilized to determine the yield point, shown at X on the torque-rotation curve illustrated in FIG. 1, for the particular fastener being tightened. If the present relationship is 50%, as is preferred and as is explained in the above-referred to application of John T. Boys, dividing circuit 106 splits the maximum stored gradient signal in half and feeds the signal to a control comparator 98 so that it may be compared with an instantaneous gradient signal from gradient signal amplifier 96 which is also fed to the control comparator. When the input signals to control comparator 98 are equal, or when the gradient signal is smaller than the divided maximum gradient signal, the control comparator provides an output signal which is fed to another AND gate 108. At this point, it should be noted that the output signal from comparator 98 could be fed directly through a valve drive amplifier 110 which would amplify the signal to a suitable magnitude to close the solenoid in valve 54 and stop motor 52. However, to assure that comparator 98 does not inadvertently provide an output signal in the pretightening region of the torque-rotation curve, that is, the region shown from the intersection of the axes to point A wherein the fasteners are relatively free spinning and have not yet engaged the members of the joint to start developing clamp load therein, AND gate 108 is utilized and receives an additional input signal from a snug torque comparator 112 on the curve illustrated in FIG. 1. Instantaneous torque signals are fed from torque amplifier 78 to snug torque comparator 112 which also receives an input signal from a preset snug torque signal generator 114 which, of course, could be in the form of a suitable potentiometer for providing a predetermined input signal representative of a torque approximately corresponding to the snug torque. The setting in snug torque signal generator 114 need not be exactly representative of the snug point and may be an approximation, for example, a signal representative of about 20% of the torque value expected at the yield point would suffice. When the instantaneous torque signal from amplifier 78 exceeds that generated by snug torque signal generator 114, comparator 112 provides an output signal to AND gate 108 which allows the feeding of the signal from control comparator 98 to valve drive amplifier 110. The output of valve drive amplifier 110 is fed to control valve 54, closing same and stopping motor 52. Thus, any signals inadvertently developed by control comparator 98 in the pretightening region of the torque-rotation curve would not close control valve 54. Finally, a reset switch 116 is provided which can be utilized to clear the circuits and prepare the tool for a new tightening operation with another fastener.

In view of the foregoing description of the wrench and control system, it can be seen that a relatively accurate tightening system has been provided which is operative to shut off the wrench at a predetermined condition precisely related to the load on the fastener, that is, the yield point of the fastener. It should also be clear that utilization of the stop signal from comparator 98 or of the gradient signal from comparator 96 would not necessarily provide an easily discernible and meaningful indication of the condition of the fastener. That is, these signals could be developed if the fastener were outside of the specification defining its characteristics or otherwise defective. Accordingly, a quality control checking system in accordance with this invention is operative to check the condition of the joint when the wrench has been shut off to provide an indication that the fastener its mating threaded member or joint members were not defective and, thus, the fastener has been properly tightened.

Before describing the preferred embodiment of a quality control checking system in accordance with this invention, reference is made to FIG. 1 wherein its principal of operation is graphically illustrated. As noted previously, the curve illustrated in FIG. 1 shows the torque-rotation relationship for any particular fastener being tightened and as should be clear, control system 51 is operative to process signals representative of these tightening characteristics to determine the yield point X on the curve, of the fastener and shut off wrench 50. The yield point, of course, is a predetermined condition is rather precisely related to the axial load on the fastener. Torque is theoretically related to the axial load for similar fasteners tightened in similar joints, but in actual usage of the fasteners this relationship varies widely because of the different friction characteristics encountered by the fasteners and/or other members comprising the joint. For example, the torque required to induce the same load in a number of theoretically similar fasteners can vary but + 30%. Thus, for any desired axial load to be induced in the fastener, a range of torque values can be determined within which the torque applied to the fastener at the desired axial load can normally be expected to lie. In accordance with this invention the torque range is determined and is defined by an upper limit, $T_u$ on the curve, and a lower limit $T_1$ on the curve, and when wrench 50 is shut off the torgue being applied to the fastener is checked to see if it is within the predetermined range.

Similarly, the rotation of the fastener is checked when the wrench is shut off to determine if it too lies within a predetermined range within which the desired axial load can normally be expected to lie. This range also is defined by upper and lower limits illustrated on FIG. 1 as $R_u$ and $R_1$, respectively. At this point it is noted that the rotation of a fastener during a tightening cycle is also related to axial load, but that in actual usage, the relationship varies due to errors in determining when to start measuring the useful rotation of the fastener as will be understood by those skilled in the art. The range defined by $R_u$ and $R_1$ should be such as to accomodate the normally expected errors.

Still referring to FIG. 1, it can be seen that the projections of the limits $T_1$, $T_u$, $R_1$, $R_u$ define a rectangle or "window" within which point X on the curve can normally be expected to lie. If wrench 50 is shut off by control system 51 within the window, it can be assumed that the fastener has been properly tightened to its predetermined condition and an easily discernible and meaningful indication can be provided. If desired, only one of the tightening characteristics can be checked, but because of the high degree of accuracy provided by control system 51, it is preferred to check two such characteristics to provide a quality control checking system providing more than the usual accuracy of more conventional systems. Finally, it should be noted that other tightening characteristics could be utilized, for example, time and torque, but that since control system 51 already provides signals representative of incremental rotation of the fastener, rotation and torque have been specifically disclosed.

Referring to FIG. 2 of the drawing, it can be seen that a signal representative of the torque being applied to the fastener is fed from torque amplifier 78 to a low torque comparator 118 and a high torque comparator 120. Low torque comparator 118 also receives an input signal from a preset signal generator 122 which signal is representative of the low torque limit, $T_l$, of the predetermined range explained above. Also, it can be seen that high torque comparator 120 receives a signal from a preset signal generator 124 representative of the upper torque limit, $T_u$, of the predetermined range. If the instantaneous torque applied to the fastener is less than the low torque limit, comparator 118 provides a high output signal which is utilized to energize an indicator lamp 126. Similarly, if the instantaneous torque applied to the fastener is greater than the upper torque limit, comparator 120 provides a high output signal which is utilized to energize another indicator lamp 128. When either lamp is energized, there is provided an indication that the torque applied to the fastener is outside the normally expected range. If the torque being applied to the fastener is greater than the low torque limit and less than the upper torque limit, comparators 118 and 120 provide low output signals which are fed to a NOR gate 130. With both input signals low, NOR gate 130 provides a high output signal energizing another indicator lamp 132 indicating that the instantaneous torque applied to the fastener is within the range defined by the limits set into signal generators 122 and 124. If either input signal to NOR gate 130 is high it provides a low output signal which will not energize lamp 132 indicator.

Rotation signals are processed by circuitry generally similar to that utilized for the torque signal except, that proximity probe 74 provides output pulses representative of incremental angles of rotation of the fastener. Accordingly, a signal from square wave generator 88 can be fed to a digital to analog convertor 134 which is operative to add the increments and provide an output signal representative of the total angular displacement of the fastener. It should be noted that rotation of the fastener in the pretightening region of the torque-rotation curve should not be counted and thus, an output signal from snug torque comparator 112 is utilized as an enabling signal which activates digital to analog convertor 134 when the joint assembly has been pulled together and actual tightening of the joint commences. The output signal from digital to analog convertor 134 can be fed to a conventional amplifier 136 to condition the signal to a magnitude compatible with the rest of the circuitry. Similar to the torque signal, the rotation signal from amplifier 136 is fed to a low angle comparator 138 and a high angle comparator 140. Comparators 138 and 140 receive signals from preset signal generators 142 and 144, respectively. Preset signal generator 142 provides a signal representative of the low rotation limit, $R_l$, of the predetermined range explained above and signal generator 144 provides an output signal representative of the upper rotation limit, $R_u$, of the predetermined range. If the rotation signal is less than the signal from signal generator 142, a high output signal is provided to energize an indicator lamp 146; similarly, if the rotation signal is higher than the signal from signal generator 144, comparator 140 provides high output signal which energizes an indicator lamp 148. When either lamp is energized there is provided an indication that the rotation of the fastener is outside the range normally expected. If the rotation signal is within the range defined by signal generators 142 and 144, comparators 138 and 140 provide low output signals which are fed to a NOR gage 150. With both input signals low, NOR gate 150 provides high output signal to energize a lamp 152 indicating that the rotation of the fastener is within the expected range. If either input signal to NOR gate 150 is high, it will provide a low output signal which will not energize indicator lamp 152. The indicator lamps, of course, can be color coded to facilitate the determination of the condition of the joint.

Since the final tightened condition of the fastener is the condition to be checked, a signal from AND gate 108 which develops the signal for shutting off the wrench can be used as an enabling signal switching NOR gates 130 and 150 to an operative condition. The signal from AND gate 108 could also be utilized as an enabling signal to switch comparators 118, 120, 138 and 140 to an operative condition, but is not so illustrated since it is deemed desirable to allow indicator lamps 126 and 146 to indicate that the lower limits have been reached and to allow lamps 128 and 148 to provide an indication to the operator of the system that the upper limits have been exceeded during tightening. In the latter instance the operator could shut off wrench 50 before the fasteners break. It should be understood, of course, that output signals from comparators 120 and 140 could be utilized to automatically shut off wrench 50 before the fasteners break. Finally, it should be realized that the torque and rotation signals could be recorded when wrench 50 has been shut off to provide a record for future use of the condition of the joint.

For checking that wrench 50 and control system 51 have not malfunctioned there is provided an inverting amplifier 154 which receives a signal from torque amplifier 78 which signal as will be remembered is representative of the instantaneous torque being applied to the fastener. Inverting amplifier 154 is operative to detect if the signal from torque amplifier 78 has a polarity opposite that normally expected of that signal. Thus, if wrench 50 is malfunctioning for any reason and rotating in the wrong direction, or if torque cell 64 is malfunctioning and providing reverse polarity signal or if torque amplifier 78 is out of balance and providing reverse polarity signal, inverting amplifier 154 will detect these conditions and provide an output signal indicative thereof through a conventional OR gate 155 to an overflow amplifier 156 in the nature of a differential amplifier or comparator and its purpose will be fully explained hereinafter. OR gate 155 may typically comprise a three diode gate such as illustrated and described in "Analog-to-Digital/Digital-to-Analog Conversion Techniques" by David F. Hoeschele, Jr., John Wiley & Sons, Inc., 1968, (pages 29 and 32) and in "Analog And Digital Electronics For Scientists" by Basil H. Vassos and Galen W. Ewing, WILEY-INTERSCIENCE, a Division of John Wiley & Sons, Inc., 1972, (pages 205 and 206).

Overflow amplifier 156 is also connected to receive input signals through OR gate 155 from torque amplifier 78 and from gradient signal amplifier 96, the latter signals as will be remembered, being representative of the instantaneous gradient of the torque-rotation curve which could be plotted for the fastener being tightened. One input to overflow amplifier 156 then is selectively from inverting amplifier 154, torque amplifier 78 or gradient amplifier 96 and the other input is a signal from a preset signal generator 158 representative of or somewhat higher than the maximum signal which would be developed by the inverting amplifier 154, torque amplifier 78 or gradient amplifier 96 if wrench 50 and control system 51 are operating properly. If the noted input devices are operating improperly, comparator 156 would provide a high output signal to indicator lamp 160 to provide a visual indication thereof and if the noted input devices are operating properly, their input signal to comparator 156 does not exceed the signal from signal generator 158 and comparator 156 provides only a low output signal which could not energize indicator lamp 160.

From the foregoing description it should be realized that the operation of the tool is checked by determining if various output signals within the system are within a predetermined range having an upper limit defined by preset signal generator 158 and a lower limit defined by the detection of a signal of reverse polarity from torque amplifier 78. It should also be realized that the torque components of control system 51 are checked, the gradient calculating components are checked and, by virtue of the fact that the gradient signal is determined by the signals representative of incremental rotation, the rotation components are checked.

At this point, it should be noted that it is desirable to provide a single indication that both the joint and the tool have been determined to be proper. Accordingly, the output signal from NOR gate 130 representative of a proper torque having been applied to the fastener and the output signal from NOR gate 150 representative of a proper angular rotation of the fastener are fed in parallel through signal inverters 166 and 168 and conventional suppressing diodes 164, 164 to signal inverter 170.

Since the outputs of NOR gates 130 and 150, if the fastener has been properly tightened, are high output signals, inverters 166 and 168 invert the signals and provide low input signals to signal inverter 170. The output signal from overflow comparator 156 is wired in parallel with the signals from signal inverters 166 and 168 and is fed through a conventional suppressing diode 164 to signal inverter 170 having an output to an indicator lamp 172. If wrench 50 and control system 51 have operated properly, overflow comparator 156 has a low signal output. When all of the signals fed to inverter 170 are low, lamp 172 is energized by the high output signal from the inverter to provide an indication that the fastener has been tightened to its predetermined condition and that the tightening system has functioned properly. If any of the input signals to inverter 170 is high it will provide a low output signal which will not energize lamp 172 providing an indication that there has been a malfunction in the tool or that the fastener has not been tightened to its predetermined condition. By checking lamps 126, 128, 132, 146, 148, 152 and 160, the defective apparatus can be determined.

From the foregoing description, it should be realized that a tightening system with a complete quality control checking system has been provided. It should also be realized that the issuance of a stop signal from stop comparator 98 is also checked by the system described above in that the torque and rotation signals would not be fed to inverter 170 if the stop signal had not enabled NOR gates 130 and 150. It should be realized that as an alternative, a signal from AND gate 108 could be delivered to inverter 170 through a suitable signal inverter such that the issuance of a stop command provides a low input signal to the first mentioned inverter. Because of the arrangement of the preferred embodiment, however additional apparatus are not required to determine if a stop signal has been provided.

While in the foregoing there has been described a preferred embodiment of a tightening system in accordance with this invention, it should be obvious to one skilled in the art that various modifications could be made within the scope of the invention as recited in the appended claims.

I claim:

1. A tightening system for tightening a fastener to a predetermined tightened condition including wrench means for imparting input tightening characteristics to said fastener, control means operatively associated with said wrench means for shutting off said wrench means at said predetermined tightened condition, means associated with said wrench means for measuring said input tightening characteristics and providing first signals indicative of the instantaneous values thereof, means for providing second signals representative of desired instantaneous values of said input tightening characteristics at said predetermined tightened condition, means for providing a third signal representative of a desired operating characteristic of said system when said wrench means and said control means are functioning properly, and quality control means for continuously checking said first signals with respect to said second signals and for continuously checking sad operating characteristic of said system with respect to said third signal.

2. A tightening system in accordance with claim 1 wherein said third signal is representative of the desired maximum value of one of said first signals and wherein said quality control means includes means for determining if said one of said first signals is smaller or larger than said third signal.

3. A tightening system in accordance with claim 1 wherein said quality control means includes means for determining if one of said first signals has a predetermined polarity.

4. A tightening system in accordance with claim 1 wherein said control means includes gradient calculating means for developing a signal representative of the gradient of a curve which could be plotted for two of said input tightening characteristics, wherein said third signal is representative of the desired maximum value of said gradient signal and wherein said quality control means includes means for determining if said gradient signal is smaller or larger than said third signal.

5. A tightening system in accordance with claim 1 wherein said quality control means includes means for determining if at least one of said first signals lies within a predetermined range.

6. A tighening system in accordance with claim 1 wherein said quality control means includes means for determining if two of said first signals lie within a predetermined range.

7. A tightening system in accordance with claim 1 wherein said quality control means provides a signal if said wrench means and said control means are operating properly and if said fastener has been tightened to said predetermined tightened condition.

8. A tightening system in accordance with claim 1 wherein said quality control means indicates the instantaneous condition of said first signals with respect to said second signals.

9. A tightening system in accordance with claim 1 wherein said quality control means indicates said operating characteristic of said system with respect to said third signal.

10. A tightening system in accordance with claim 1 wherein said predetermined tightened condition is the yield point of the fastener.

11. A tightening system for tightening a fastener to a predetermined tightened condition including wrench means for imparting input tightening characteristics to said fastener, control means operatively associated with said wrench means for shutting off said wrench means at said predetermined tightened condition, means associated with said wrench means for measuring two of said input tightening characteristics and providing first signals indicative of the instantaneous values thereof, means for providing second signals representative of desired instantaneous values of said two input tightening characteristics at said predetermined tightened condition, means for providing a third signal representative of a desired operating characteristic of said system when said wrench means and said control means are functioning properly, quality control means for continuously checking said first signals with respect to said second signals and for continuously checking said operating characteristic of said system with respect to said third signal, said control means including gradient calculating means for developing a signal representative of the instantaneous gradient of a curve which could be plotted for said two input tightening characteristics, said quality control means including means for determining if one of said first signals or said gradient signal is smaller or larger than said third signal, or if the polarity of at least one of said first signals is proper, and further including means for determining if each of said first signals lie within a predetermined range of values of said second signals, said range of values being indicative of a properly tightened fastener with respect to said predetermined tightened condition.

12. A tightening system in accordance with claim 11 wherein said quality control means provides an indicator signal if said wrench means and control means are operating properly and if said fastener has been tightened to said predetermined tightened condition.

13. A tightening system in accordance with claim 12 wherein said control means includes means for determining the maximum gradient in a tightening cycle and providing a signal indicative of said maximum gradient and means for shutting off said wrench when said instantaneous gradient signal has a predetermined relationship with said maximum gradient signal.

14. A tightening system in accordance with claim 13 wherein said tightening characteristics are torque and rotation.

15. A tightening system in accordance with claim 11 wherein said predetermined tightened condition is the yield point of the fastener.

* * * * *